United States Patent [19]

Pirochta, Jr.

[11] 3,809,177
[45] May 7, 1974

[54] VEHICLE DRIVE AXLE WHEEL ASSEMBLY

[75] Inventor: John F. Pirochta, Jr., Okemos, Mich.

[73] Assignee: General Motors Corporation, Detroit, Mich.

[22] Filed: Jan. 29, 1973

[21] Appl. No.: 327,589

[52] U.S. Cl. ............................... 180/88, 308/187.1
[51] Int. Cl. ............................................ B60b 35/00
[58] Field of Search ......... 301/6 R, 6 W; 308/187.1; 180/88

[56] References Cited
UNITED STATES PATENTS

| 2,387,301 | 10/1945 | Sanford | 308/187.1 |
| 7,674,256 | 6/1928 | Nelson | 308/187.1 |
| 3,320,007 | 5/1967 | Tennies, et al. | 308/187.1 |

*Primary Examiner*—David Schonberg
*Assistant Examiner*—Jack D. Rubenstein
*Attorney, Agent, or Firm*—Paul Fitzpatrick

[57] ABSTRACT

A vehicle drive axle wheel assembly having a brake backing plate and a retainer plate fixed to an axle tube of the vehicle, the brake backing plate having an opening and a channel aligned with a corresponding channel in the retainer plate to direct the flow of any lubricant leaking past the axle bearing seal of the assembly away from the side of the backing plate on which the brake components are mounted.

2 Claims, 2 Drawing Figures

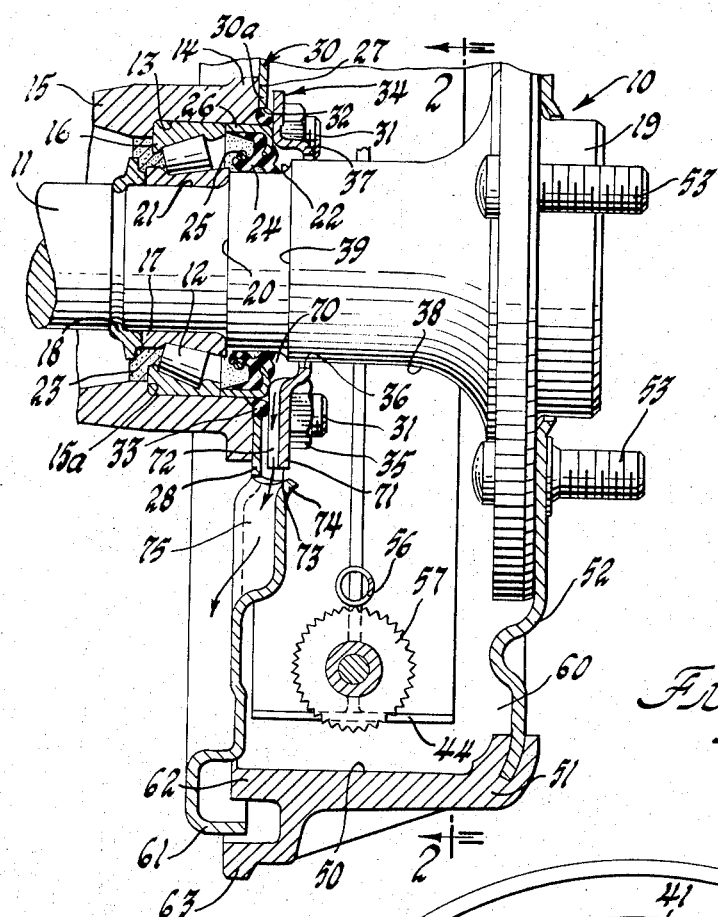
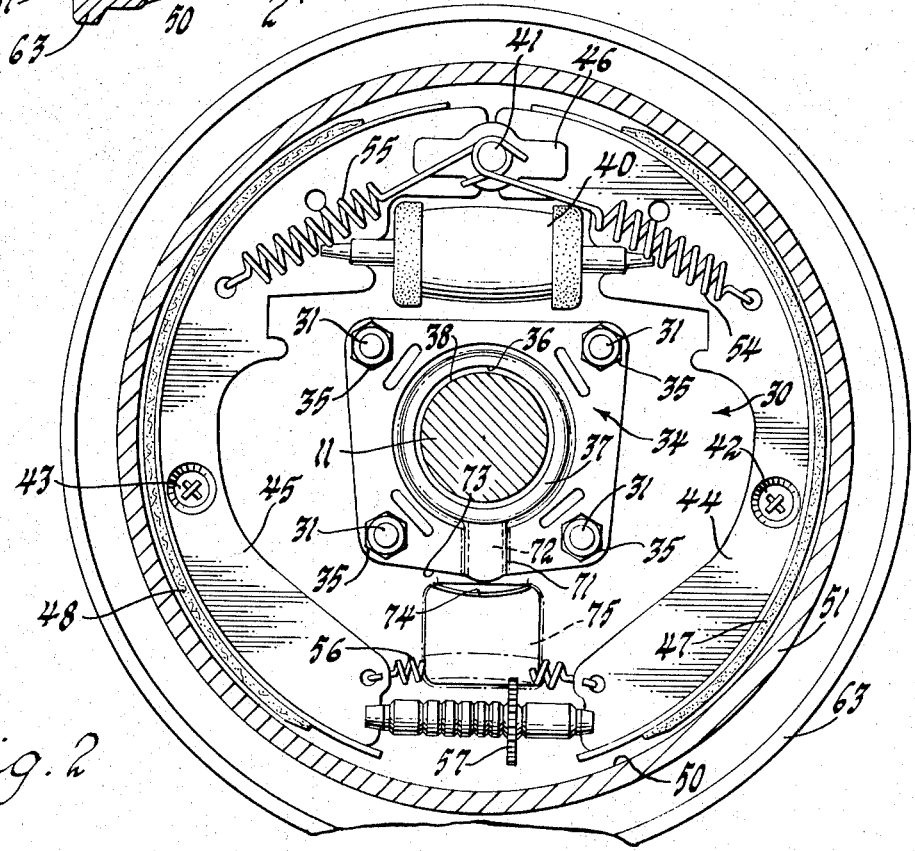

VEHICLE DRIVE AXLE WHEEL ASSEMBLY

This invention relates to a vehicle wheel assembly and, particularly, to a drive axle wheel assembly of a vehicle having a lubricant passage to direct the flow of lubricant away from the brake elements of the assembly.

In a vehicle drive wheel assembly, the drive axle of this assembly, which is usually the rear axle of the vehicle, is journaled by a suitable bearing that is supported by an axle tube of the vehicle differential and that is packed with a suitable bearing lubricant. A seal is positioned outboard of the bearing to normally prevent any lubricant from moving axially outboard along the axis shaft to a point where the lubricant could drop onto brake components mounted on one side of a brake backing plate fastened to one end of the axle tube to encircle the axle shaft. Since operation of the brake system might be degraded by even a small amount of lubricant on certain brake components, it is desirable to prevent lubricant escaping past the seal from dropping onto the brake components.

It is therefore an object of the present invention to provide a vehicle drive axle wheel assembly wherein any bearing lubricant escaping axially along the axle shaft, to a point outboard the bearing seal of the assembly, is prevented from dropping onto the brake components attached to one side of the brake backing plate encircling the axle shaft.

It is another object of the present invention to provide a vehicle drive axle wheel assembly wherein a lubricant passage is provided axially outboard the bearing seal to drain lubricant away from the side of the backing plate on which the brake components are mounted.

It is another object of the present invention to provide a vehicle drive axle wheel assembly whereby two channels, one in the retainer plate of the assembly and the other in the backing plate thereof, are aligned to direct axle lubricant from a point axially outboard the seal about the axle shaft of the assembly to the inboard side of the brake backing plate supporting brake components of the assembly on its outboard side.

These and other objects of the invention are attained in a vehicle drive axle wheel assembly by a channel provided in the brake backing plate of the assembly holding some of the brake components on one side thereof and a channel provided in the retainer plate of the assembly. Both the backing plate and the retainer plate are connected to one end of the axle tube of the vehicle differential so as to encircle the axle shaft which is journaled by a bearing supported in the axle tube and packed therein with lubricant. To normally prevent an axial outboard movement of this lubricant along the axle shaft from the axle tube, an annular seal is positioned at one end of the axle tube between the bearing and the retainer plate to slidingly engage an outer diameter portion of the axle shaft. The channels are aligned to be coplanar at a point axially outboard the seal and extend in a downward direction from the axle shaft. To direct axle lubricant escaping axially outward from the seal away from the side of the backing plate on which the brake components are mounted, the channel in the brake backing plate opens in an inboard direction.

For a better understanding of the invention as well as other objects and further features thereof, reference is made to the following description taken in conjunction with the attached single sheet of drawings wherein:

FIG. 1 shows an axial cross section of a portion of a vehicle drive axle wheel assembly provided in accordance with the present invention and, FIG. 2 is an end view of a vehicle drive axle assembly of FIG. 1 taken along line 2—2 thereof.

With reference now to FIG. 1, there is shown a vehicle drive axle wheel assembly generally designated as 10 having a generally conventional design including a drive axle shaft 11, one end of which is drivingly connected such as by splines, not shown, to the side gear of a vehicle differential, not shown, and the other end of which terminates in a flanged hubbed end 19. Axle shaft 11 is journaled by a suitable bearing 12 positioned in the counterbore 13 provided in the flanged bearing end 14 of an axle tube 15, the other end of axle tube 15 being connected to the housing of the vehicle differential, not shown. The outer race 16 of the bearing 12 is positioned axially against the shoulder 15a of the axle tube 15 and the inner race 17 is locked by a suitable bearing retainer 18 against a shoulder 20 intermediate a reduced diameter portion 21 of axle shaft 11 and an intermediate diameter portion 22 thereof. The bearing is packed with a suitable lubricant 23 that is normally retained in the counterbore 13 by a sealing arrangement including an annular seal 24, the inner peripheral lip of which is held in sealing engagement against intermediate diameter portion 22 of shaft 11 by a snap ring 25 and a cup-shaped seal retainer cup 26, the radial side portion of which is imbedded in seal 24 and the cylindrical portion of which supports the outer portion of seal 24 and is positioned in counterbore 13 so as to extend axially outboard the chamfer at the mouth thereof slightly past the outboard radial surface 27 of the flanged bearing end 14 of axle tube 15.

A dish-shaped brake backing plate 30 is mounted on studs 31 extending axially outward from flange bearing end 14 of the axle tube so that the lip 32 of a central aperture in the brake backing plate 30 encircles the axle shaft 11 and is radially spaced therefrom. An O-ring 33 is positioned in the annular gap between the inner peripheral lip 32 and the outer peripheral surface of retainer cup 26. A retainer plate 34 is fixed by the studs 31 and nuts 35 threaded thereon outboard of the brake backing plate 30 and is positioned such that inner peripheral lip 36 of the centrally apertured flange portion 37 of retainer plate 34 encircles the enlarged diameter portion 38 of axle shaft 11 axially outboard the shoulder 39 separating enlarged diameter portion 38 from intermediate diameter portion 22. The inner radial portion 30a of brake backing plate 30 and the retainer plate 34 mounted thereover are secured to radial surface 27 of the flanged bearing end 14 of axle tube 15 by nuts 35 threaded down on studs 31, retainer plate 34 at the same time sandwiching the seal retainer cup 26 against the outer race 16 of bearing 12 and also compressing the O-ring 33 so as to provide an effective seal between the outer periphery of the cylindrical portion of the seal retainer cup 26, the lip 32 of backing plate 30, and the axle tube.

Mounted on the axially outward facing side of brake backing plate 30 are the conventional components of a vehicle brake assembly including the wheel hydraulic wheel cylinder 40, the anchor pin 41 and the shoe holddown spring assemblies 42 and 43. The brake shoes 44 and 45 are movably secured to the backing plate 30 by the shoe hold-down spring assemblies 42 and 43, respectively, and by the anchor pin guide plate 46. The brake shoes 44 and 45 are, respectively, provided with brake linings 47 and 48 which are movable into and out of engagement with the inner cylindrical surface 50 of the wheel brake drum 51, brake drum 51 being connected by a disk-like support plate 52 to the wheel mounting studs 53 extending through the flanged hubbed end 19 of axle shaft 11 and cooperating in a known manner with the brake linings 47 and 48 to selectively effect braking action upon pressurization of the hydraulic wheel cylinder 40. Shoe retraction springs 54 and 55 are each secured at one of their ends to the anchor pin 41 and at their other ends, respectively, to the brake shoes 44 and 45 so as to retract the shoes when the pressure to the hydraulic cylinder 40 is released. A holding spring 56 is connected at its opposite ends to the other ends of brake shoes 44 and 45, respectively, to bias these ends of the brake shoes against an adjuster device 57.

As best seen in FIG. 1, the components of the brake assembly are positioned in what may be called a brake component chamber 60 formed between the outboard side of the brake backing plate 30 and the inboard side of brake drum 51. The admission of foreign matter into this chamber is normally minimized by the location of the inner lip 36 of the retainer plate 34 in close proximity to the enlarged diameter portion 38 of axial shaft 11 and by the sealing arrangement provided between the outer peripheral flange 61 of brake backing plate 30 facing oppositely and axially overlapping the peripheral flanges 62 and 63 provided at the axially inboard surface of wheel drum 51.

While seal 24, shoulder 39, and axial flange portion 37 are normally effective to prevent the bearing lubricant 23 from moving axially outwards to a point on the enlarged diameter portion 36 of axle shaft 11 where escaped lubricant might drop on the brake components in brake chamber 60, it is nevertheless desirable to assure that any lubricant which may escape past seal 24 is effectively prevented from dropping on the brake components.

Now, in accordance with the invention, a lubricant passage is provided near the outboard end of the drive axle wheel assembly for draining any lubricant which may leak outboard of the seal 24 to a location away from the brake components to prevent this lubricant from contaminating the brake linings. As can be seen in FIG. 1, any lubricant which may leak outboard to the right, with reference to this figure, past the seal 24 would flow along the outer periphery of the intermediate diameter portion 22 of the axle shaft 11 and then tend to fall off from the shoulder 39 onto the axial flanged portion 37 of the retainer plate 34. This lubricant would flow and then collect in the bottom of the chamber 70 formed between the axially extending portion 37 of the retainer plate 34 and the seal 24.

To permit drainage of this lubricant, a portion of the flange portion 37 of the retainer plate 34 is deformed in an outboard direction to provide a downwardly extending chute or groove portion 71 in the retainer plate positioned below the axle shaft 11, which with the straight radial portion 28 of the brake backing plate 30 provides a downward direct drain passage 72 for this lubricant, the radially lower end of this drain passage 72 terminating at the lower edge 73 of retainer plate 34.

To direct the flow of lubricant discharged from this drain passage 72 away from the operating components of the brake assembly positioned on the outboard side of the brake backing plate 30, the radial portion 28 of the brake backing plate 30 is pierced and deformed in an axially outboard direction to the right with reference to FIG. 1, to provide a flared mouth opening 74 below the lower end of drain passage 72 and a channel or drain passage 75. Opening 74 is located radially outboard both the lower edge 73 of retainer plate 34 and the flanged bearing end 14 of axle tube 15 and is formed as by stamping the axial inboard side of radial portion 28 in an axially outward direction so as to be axially outboard groove portion 71 of retainer plate 34. The flared mouth end 74 is located outboard and below the lower end of drain passage 72 so that any lubricant dropping from the passage 72 can flow down the channel 75 on the axially inboard side of brake backing plate 30 and therefore away from brake chamber 60.

Having described one embodiment of the present invention, it is understood that the specific terms and examples are employed in a descriptive sense only and not for the purposes of limitation. Other embodiments of the invention, modifications and alternatives may be used. I therefore aim in the appending claims to cover such modifications and changes as fall within the true spirit and scope of my invention.

What is claimed is:

1. In a vehicle drive axle wheel assembly including an axle tube having one end connected to the vehicle differential and the other end having a counterbore therein, bearing means positioned in the counterbore of the axle tube, an axle shaft rotatably supported by the bearing means in the axle tube, annular seal means positioned in the counterbore axially outboard the bearing means, and operative to sealingly engage the periphery of the axle shaft, a centrally apertured brake backing plate having brake components mounted on one side thereof connected to the end of the axle tube encircling the axle shaft, and a centrally apertured retainer plate connected to the bearing end of the axle tube axially outboard the brake backing plate and the seal means, the retainer plate encircling the axle shaft and operative to retain the seal means in the counterbore of the axle tube, the improvement comprising:

a. a first channel provided in the retainer plate and a second channel provided in the brake backing plate radially outboard of said first channel, said first channel and said second channel opening axially inward towards the bearing end of the axle tube and being aligned to be substantially coplanar with each other and extending in a radially downward direction away from the axle shaft, said first channel and said second channel cooperating to direct a lubricant flowing past the seal means to the side of the backing plate opposite the side on which the brake components are mounted.

2. In a vehicle wheel assembly including an axle tube having a differential end connected to the vehicle differential and a bearing end having a counterbore therein for receiving bearing means, an axle shaft assembly including lubricated bearing means positioned in the counterbore of the axle tube, an axle shaft rotatably supported by the bearing means in the axle tube and having a differential end connected to a side gear of the vehicle differential and a hubbed end extending axially outwards from the bearing end of the axle tube, an annular seal means positioned in the axle tube counterbore axially outboard the bearing means and sealingly engaging the axle shaft, a centrally apertured dish-shaped brake backing plate connected to the bearing end of the axle tube encircling the axle shaft, a centrally apertured retainer plate connected to the bearing end of the axle tube encircling the axle shaft outboard of the brake backing plate; a brake assembly including a cylindrical brake drum connected to the hubbed end of the axle shaft and extending axially inwards therefrom towards the bearing end of the axle tube, and providing with the brake backing plate and the hubbed end of the axle shaft a brake component chamber, the improvement comprising:

a. a first channel provided in the retainer plate and extending downward below the axial shaft, a second channel and opening provided in the backing plate below said first channel, said second channel opening towards the bearing end of the axle tube away from the brake component chamber and said first channel and said second channel being aligned in substantially the same plane and extending radially in the same radial direction from the axle shaft.

* * * * *